INVENTOR
Frank Magidson
By Green & McCallister
His Attorneys

INVENTOR
Frank Magidson
By Green & McCallister
His Attorneys

Patented Sept. 29, 1942

2,297,156

UNITED STATES PATENT OFFICE 2,297,156

MACHINE FOR MAKING "GEM" PAPER CLIPS

Frank Magidson, Pittsburgh, Pa., assignor to Pittsburgh Cut Wire Company, a corporation of Pennsylvania Application October 30, 1941, Serial No. 417,130

18 Claims. (Cl. 140—82)

This invention relates to wire working machines and more particularly to a machine for manufacturing wire paper clips such as those now commonly known as "Gem" clips.

An object of this invention is to provide an improved machine by which "Gem" clips can be produced in large quantities and at a relatively low cost.

Another object is to provide a machine for making such clips whereby the adjacent substantially straight portions of the clips are caused to lie in contact.

A further object is to produce an automatic machine which not only forms such clips quickly and accurately, but delivers predetermined numbers of the same to the boxes in which they are to be shipped.

These as well as other objects, which will be apparent to those skilled in this particular art, I attain by the method and machine described in the specification and illustrated in the drawings accompanying and forming part of this application.

In the machine of this invention, a reciprocating wire feeder pulls the wire from a coil through a roller wire straightener which, aside from the wire straightening rollers, includes rollers for removing the set in the coiled wire as received from the wire manufacturers. The wire feeder operates in a step by step manner and advances a length of straightened wire past the wire cutting device and into position within the bending mechanism which forms the loops of the clip. As soon as such length of wire reaches position within the bending mechanism, the cutter blade operates to partially cut through the wire, thereby locking the same in position. The wire feeder then travels back into position to start its next feeding stroke. Two of the loops of the clip are then formed. The cutter then completes its cut through the wire and the third loop is formed. The end loops are then expanded while the straight outer side members of the clip are held in position against outward lateral movement. This operation forces the outer straight side members into contact with the inner straight side members and causes them to remain in this position by giving to the end loops and outer straight side members a permanent set. Immediately after the loop expanding operation is completed, the finished clip is discharged downwardly through a chute.

A box carrier which forms part of the machine is arranged to rotate below said chute about a vertical axis. This carrier is provided with an annular series of holders adapted to carry the boxes in which the clips are to be shipped. These boxes pass in succession below said chute. Rotation of the box carrier is intermittent and the periods are so adjusted that each box is halted below the chute until it has received its definite quota of clips. The machine thus not only forms the clips automatically but counts and delivers the same into the boxes in which they are to be shipped.

*Wire feeder and wire straightener*

I have found that since the wire used in making the clips is coiled and has coil set, a simple form of roller wire straightener alone is not adequate, because when such a straightener is used alone, the unsupported end of the wire leaving the straightener has a tendency to bend out of position, and this may be in any direction. Even though such bending may be slight, it makes it difficult to keep the straight side members of the clip in a common plane.

In order to make use of a simple wire straightener, and be assured that the wire leaving the straightener will be straight, or will at least always bend but slightly in the plane in which the clips are formed, I subject the wire, prior to the wire straightening operation, to an operation which practically removes or nullifies the strains due to coiling. In such operation, I subject the wire to a looping operation which is much more severe than that to which it was subjected during coiling. I accomplish this bending in one plane, in this machine in a vertical plane, since the bending operations by which the clip loops are formed take place in a vertical plane. This looping before straightening is so severe that all tendency of the wire to bend out of this vertical plane after leaving the straightener is overcome. Whatever tendency there is to bend is but slight and can be overcome by simple adjustment of one or at most two of the wire straightener rollers.

The wire W is drawn by the feeder mechanism (hereinafter referred to as the wire feeder) from a coil (not shown) through the wire straightener mechanism (hereinafter referred to as the wire straightener). The wire feeder and wire straightener are shown in a general way in the upper right-hand part of Fig. 1 and in more detail in Figs. 2 and 3.

The wire feeder comprises a carriage 30 mounted for reciprocation within guides 31 on frame member 32 of the machine. The carriage is provided with an upper portion 33 which, extending laterally thereof, overlies wire W and is provided at its opposite ends with wire guides 34.

Figures 2, 3, 21:
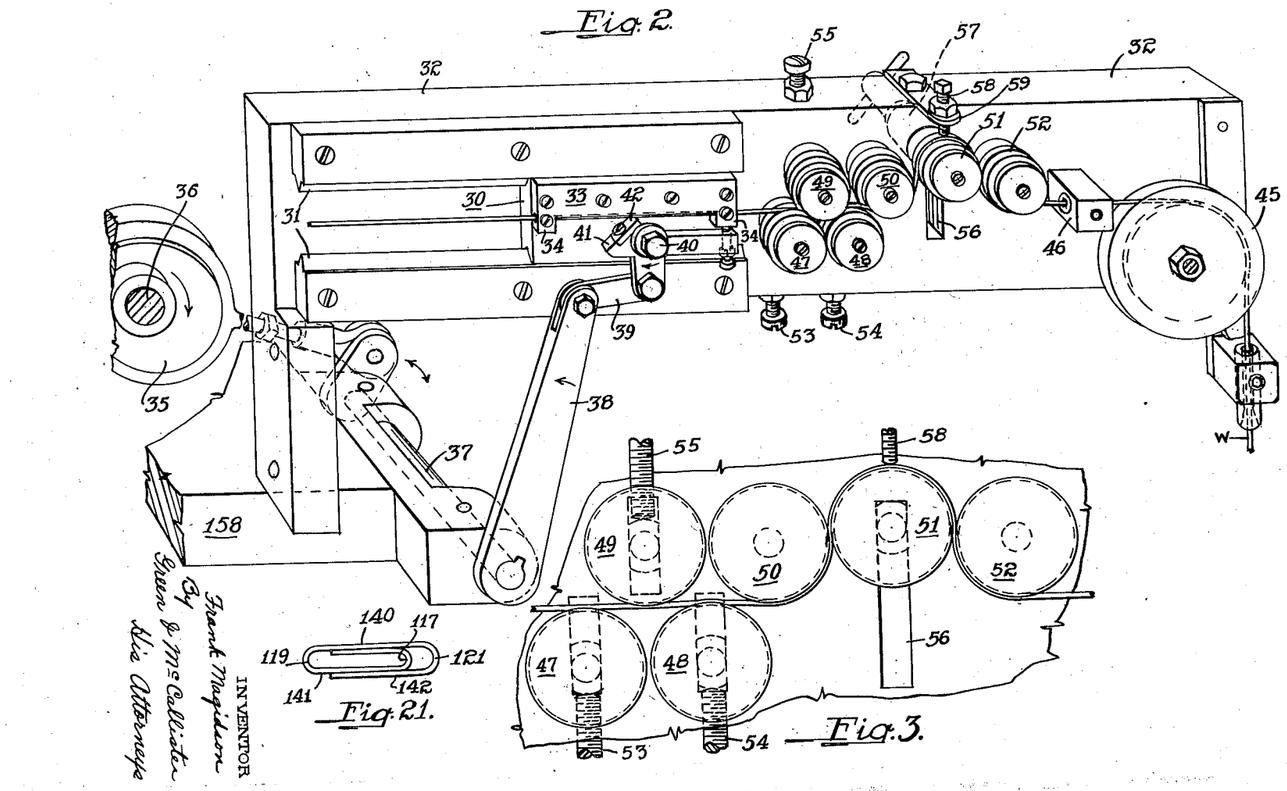
Fig. 2 is a perspective view of the reciprocating wire feeder, the roller straightener and the mechanism for nullifying the effect of coil set in the wire and giving to the wire a definite predetermined set before it enters the straightener roller.
Fig. 3 is a diagrammatic layout of the rollers of the last two of these mechanisms and shows the travel of the wire therethrough.
Fig. 21 is a view of a "Gem" clip such as made by the method and machine of this invention.

Reciprocation of the carriage is accomplished by an eccentric 35 on main shaft 36 of the machine. This eccentric, as will be seen from Fig. 2, is arranged to oscillate a horizontal shaft 37 which carries a lever arm 38. Lever arm 38, by means of a link 39, is connected to one arm of a bell crank lever pivoted at 40 to the carriage. An extension 41 of the bell crank lever carries a hardened wire contact member 42, and from the construction as illustrated in Fig. 2, it will be apparent that as lever arm 38 swings counterclockwise from the position shown in said figure, the first effect is to cause contact member 42 to move up to pinch the wire between its contact edge and the under face of portion 33, overlying the wire. Continued movement of the lever arm in the same direction causes the carriage to move toward the left and propel the wire ahead of it and through hole 43 in cylindrical cutter block 44 and into that portion of the machine within which the wire is bent into clip form.

The wire passes up through a guide over a guide roller 45, through a guide block 46 through the passes of the rollers by means of which the coil set in the wire is removed or nullified and through the passes of the rollers of the simple wire straightener.

I have found that when making "Gem" paper clips of the size shown in Fig. 21, from steel wire known as "tinned paper clip wire," I can obtain highly satisfactory results by employing six rollers arranged as disclosed in Fig. 3 of the drawings.

All of the rollers are the same and are approximately one and three-sixteenths of an inch in diameter (to be exact 1.181"), and are mounted on anti-friction bearings. I preferably use standard ball bearings as the rollers and cut the wire groove in the outer race of such bearings.

The grooves in all of the rollers are the same and have a depth which is at least equal to one-half the diameter of the wire, which diameter for clips of the size shown in Fig. 21, is .041".

The axes of lower rollers 47 and 48 are located in vertically extending parallel planes which are spaced apart a distance of 1¼ inches, and the axes of the upper rollers 49, 50, 51, and 52 are similarly located in parallel planes which are also spaced apart a distance of 1¼ inches. The vertical plane within which the axis of roller 49 is located is exactly midway between the planes within which the axes of rollers 47 and 48 are located and the vertical plane within which the axis of roller 50 is located is exactly midway between the vertical planes within which the axes of rollers 48 and 51 are located.

Rollers 47, 48 and 49 are carried by holders which fit within vertically extending slots in frame member 32 and can be adjusted to vary the height of said rollers, by adjusting screws which are respectively numbered 53, 54 and 55. A holder for the spindle of roller 51 is slidable vertically in a slot 56, and, when the machine is in operation, is locked at the top of its slot by means of a locking device 57. When locked in such position, its axis is approximately ⅛" above the axes of rollers 50 and 52, which axes are fixed.

A screw 58 carried by a bracket 59, projecting laterally of frame member 32, is adjusted so that its lower end lightly bears on the top of the wire as it passes over roller 51. This prevents upward and backward movement of the wire when it is severed by the cutting blade.

Roller 47 is so adjusted that the bottom of its groove lines up with the bottom of hole 43 which passes through the longitudinal center of the cylindrical cutter block.

In order to thread the wire into position in the machine, it will be apparent that it is necessary to lower roller 51 until its top is below the bottoms of rollers 50 and 52. After the wire is threaded into position, roller 51 is raised and locked in position, as shown in Fig. 3.

Wire bending mechanism

The mechanism into which the wire enters after it passes through cylindrical cutter 44, and by means of which it is bent into clip form, is located beneath a cover plate 60.

Figures 1, 10, 11:
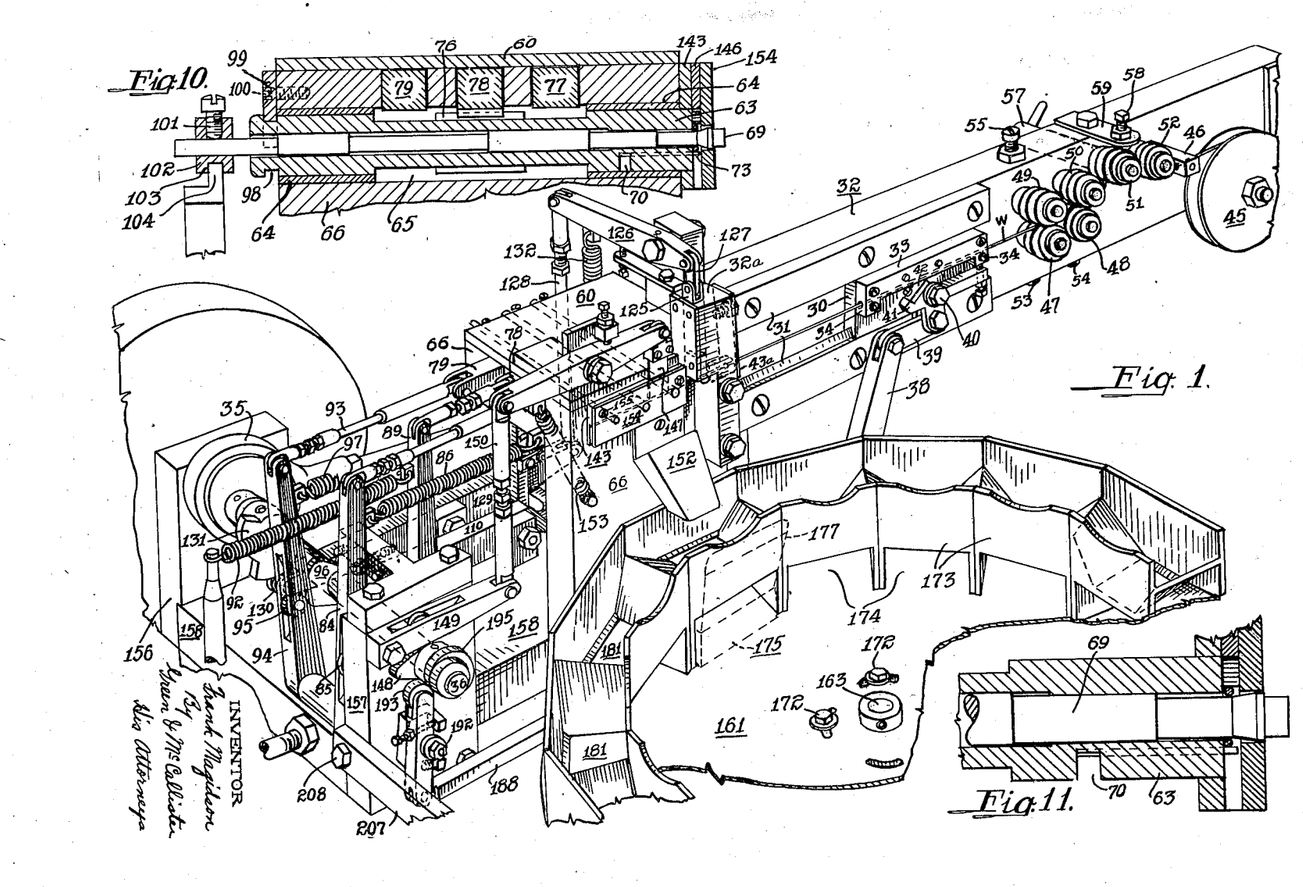
Figure 1 is a perspective view of the major operating parts of the machine of this invention with a portion of the box carrier broken away.
Fig. 10 is a detail view, partially in elevation and partially in section, of one wire bending spindle and its mandrel. This view shows the position of the reciprocating rack members by which the spindles are rotated.
Fig. 11 is an enlarged fragmentary view in sectional elevation, of one of the end loop wire bending spindles with its mandrel in position as it appears just prior to the loop expanding operation.
Figures 4, 5, 6, 7, 8, 9:
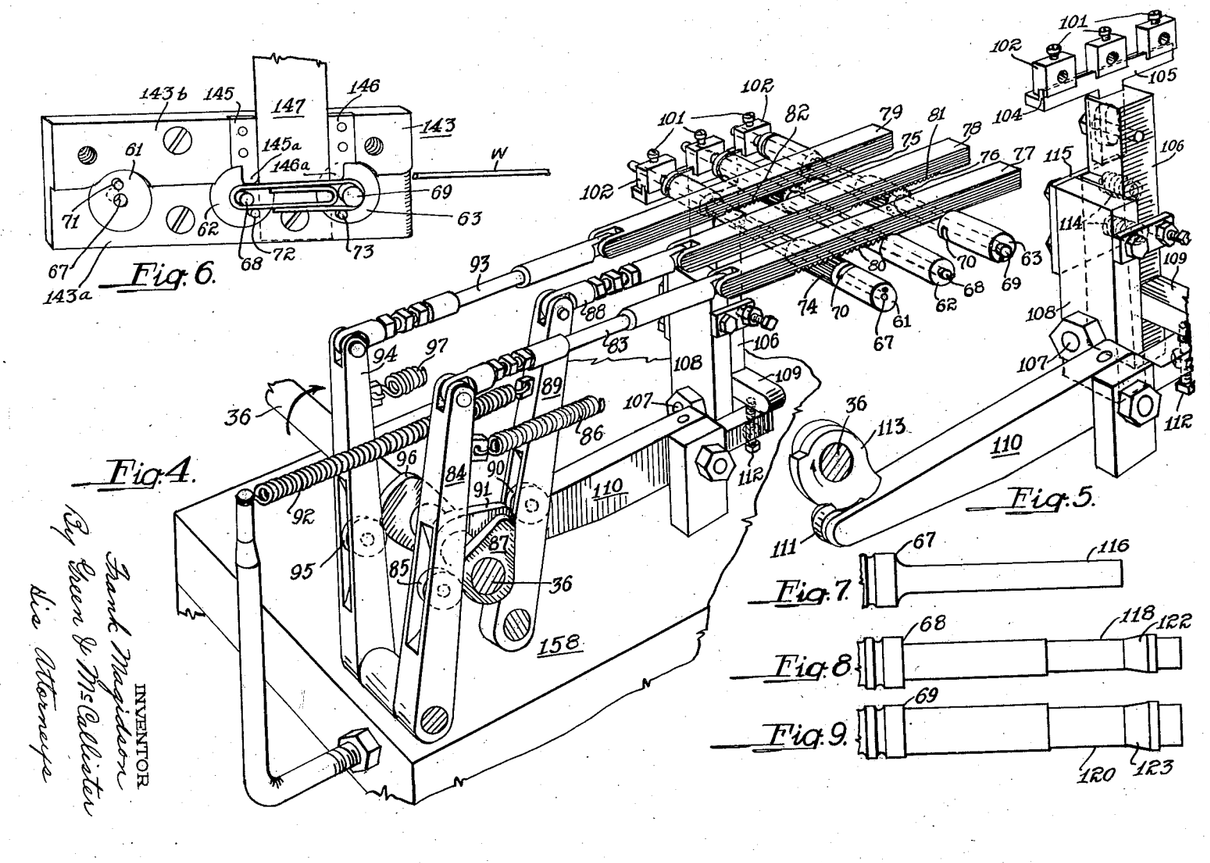
Fig. 4 is a skeleton perspective view of the wire bending spindles of the clip forming portion of the machine, the reciprocating mandrels about which the wire is bent and about which said spindles rotate, and the mechanisms for rotating said spindles and reciprocating said mandrels.
Fig. 5 is a detail perspective view of the mechanism for reciprocating the mandrels about which the wire is bent by the spindles.
Fig. 6 is a perspective view looking toward the forward ends of said spindles and mandrels. This view shows a finished clip in position on two of the mandrels just before it is to be discharged into the chute by the knockout blade which is also illustrated in this view.
Figs. 7, 8 and 9 are views in side elevation of the three mandrels about which the wire is bent during the loop forming operation. In these views the mandrels are shown twice their actual size.

This mechanism comprises three horizontally positioned spindles 61, 62 and 63, mounted for rotation within bearing bushings such as bushings 64—64, which are preferably pressed into parallel horizontal cylindrical bores 65 located below said cover plate in frame part 66. Each of these spindles is provided with an axial cylindrical bore for the reception of a generally cylindrical mandrel. These mandrels are held against rotation and are arranged to be periodically reciprocated lengthwise of the spindles at proper times during operation of the machine. The mandrel located within spindle 61 is numbered 67 (Fig. 7) that within spindle 62 is numbered 68 (Fig. 8) and that within spindle 63 is numbered 69 (Fig. 9). Each of the spindles adjacent its outer end is drilled to provide a bore which parallels the bore in the mandrel, and extends from the outer end face of the spindle to a cross slot such as 70 (Figs. 4, 10 and 11). A tungsten carbide pin is fitted into each of these bores and extends from a point adjacent the inner face of said cross slot 70 outwardly beyond the forward end face of its spindle a sufficient distance to properly engage wire W to bend the same around the mandrel. The pin for spindle 61 is numbered 71, that for spindle 62 is numbered 72 and that for spindle 63 is numbered 73.

Spindle 61 is provided with gear teeth 74, spindle 62 with gear teeth 75 and spindle 63 with gear teeth 76.

Parallel horizontally positioned rack bars 77, 78 and 79 are mounted for reciprocation at right angles to said spindles and within guideways formed in frame part 66 of the machine. Bar 77 is provided with rack teeth 80 which mesh with gear teeth 74 of spindle 61. Bar 78 is provided with rack teeth 81 which mesh with gear teeth 76 of spindle 63 and bar 79 is provided with rack teeth 82 which mesh with gear teeth 75 of spindle 62.

An adjustable link 83 connects the upper end of a follower lever 84 to one end of rack bar 77. Said follower lever carries a cam contact roller 85 which is held in contact, by means of a helical spring 86, with a cam 87. Rack bar 78, by means of an adjustable link 88, is connected to the upper end of a follower lever 89. This follower lever carries a cam contact roller 90 which is held in contact with cam 91 by means of a helical spring 92. Rack bar 79, by means of an adjustable link 93, is connected to the upper end of a follower lever 94. Lever 94 is provided with a cam contact roller 95 which is held in contact with a cam 96 by means of a helical spring 97. These cams are all secured to main shaft 36 of the machine.

Each spindle, adjacent its rear end is provided with a circumferential groove 98, and a retainer plate 99 secured to housing part 66, by means of screws 100, is provided with three semi-circular slots which permit the retainer plate to extend into the circumferential grooves 98 and lock the spindles against endwise movement.

Secured to each mandrel adjacent its rear end, by means of a set screw 101, is a block 102, and each of these blocks is provided with a bottom groove 103 designed to loosely embrace an upstanding flange 104 of a mandrel operating member 105 (Fig. 5).

Member 105 is secured for vertical adjustment within a lever 106 which is pivoted, by means of a pivot bolt 107, to a vertically extending post 108. Post 108 forms part of the frame of the machine.

Lever 106 is provided with a forwardly extending arm 109 and is periodically rocked about pivot bolt 107 by a horizontal cam follower lever 110. This follower lever at one end carries a cam contact roller 111, and at its opposite end carries an adjusting screw 112, having its upper end bearing on the under face of extension 109 of lever 106. Follower lever 110 is operated by a cam 113 keyed to main shaft 36 in line with said roller 111. Roller 111 is yieldingly held in contact with cam 113 by means of two relatively stiff helical springs 114—114 which are pocketed in lever 106 and have their outer ends bearing against a plate 115 bolted to the rear side of post 108.

The outer end portion 116 of mandrel 67 is of such diameter as to form inner loop 117 of the clip when the wire is bent around the same. Mandrel 68 has a cylindrical portion 118 which is of such diameter as to form end loop 119 when the wire is bent around this cylindrical portion, and mandrel 69 is provided with a cylindrical portion 120 around which the wire is bent to form end loop 121 of the clip.

Extending outwardly beyond cylindrical portions 118 and 120 of mandrels 68 and 69, respectively, are portions 122 and 123 which are formed in the nature of truncated cones and by means of which the end loops 119 and 121 of the clip are expanded or stretched as will be later explained.

Wire cutter blade and its operating mechanism

A wire cutter blade 124, which cooperates with the lower half of the exit end of hole 43 in cylindrical cutter block 44, is carried by a member 125 which is vertically reciprocated slightly by an oscillating lever 126, to one end of which it is connected by a link 127. The opposite end of lever 126, by means of an adjustable link 128, is connected to one end of a follower lever 129 carrying a cam contact roller 130. This roller is held in engagement with a main shaft cam 131 by means of a helical spring 132.

Cutter block 44 is so mounted that it is free to slide lengthwise in its bore in frame post 32a. Its body portion is slightly longer, say about $\tfrac{1}{16}''$, than the width of said post. The entrance end of the cutter block is formed with an annular flange 44a which surrounds hole 43 and is chamfered to form a bell mouth for said hole. A stiff blade spring 43a, secured to frame post 32a above the cutter block, is provided with a circular hole which is slightly greater in diameter than the external diameter of said flange. This permits spring 43a to bear against the end of the body of the cutter block surrounding said flange and yieldingly hold the block in contact with the cutter blade. It will be understood that the movement of the cutter blade is so slight that it never moves out of contact with the exit end of the cutter block. The construction and arrangement of these parts is such that the cutter blade is, in effect, self-sharpening and I have found that the cutting of wire W is effected without leaving any burrs on the ends of the wire.

Adjustment and operation of the wire cutting blade and the wire bending mechanism Before proceeding further with the description of the remainder of the machine, it is believed advisable to describe the adjustment and operation of the wire severing and wire bending or clip forming mechanisms.

Figures 12, 14, 15, 16:
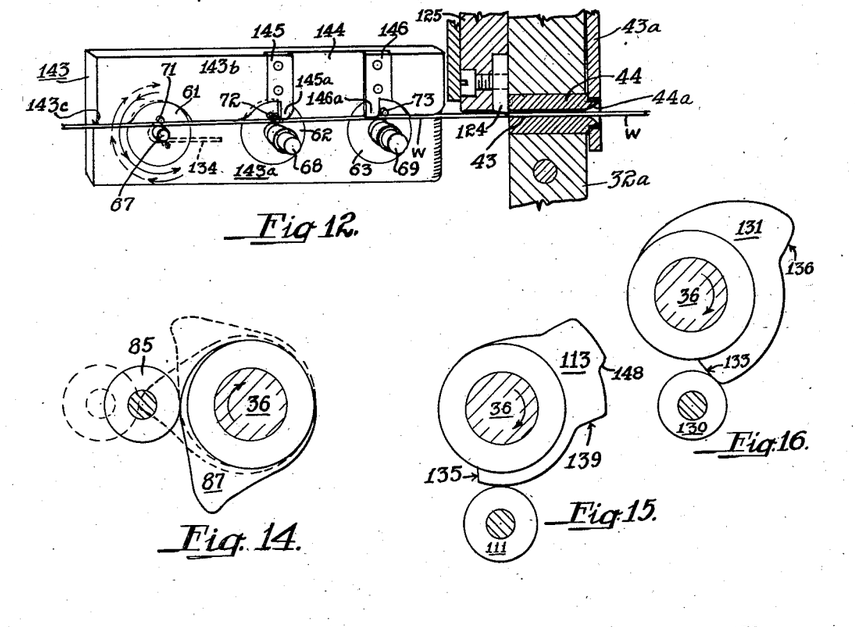
Fig. 12 is a view partially in perspective and partially in section and shows the forward ends of the three spindles and their mandrels, and the wire anchoring and cutting means. This view shows the wire in place within the loop forming part of the machine with the wire anchored by the cutter blade before any loop has been formed.
Figs. 14 to 20 inclusive are detail views of the rotating cams entering into the make-up of the machine. These views include the rollers which are carried by the cam followers or follower levers.

The wire feeder on each feeding stroke, propels a length of wire W through hole 43 of the cutter block and into position in the bending mechanism as shown in Fig. 12. At this time spindles 61, 62 and 63 are at rest and with their pins 71, 72 and 73 located directly over their mandrels 67, 68 and 69; wire W during travel into position passing between the mandrels and said pins. As soon as the wire reaches this position, rise 133 of cam 131 causes cutter blade 124 to partially cut through wire W. As soon as this occurs, cam 87, through follower lever 84 and rack bar 77, rotates spindle 61 counterclockwise, as indicated at the left of Fig. 12, whereby its bender pin 71 is caused to bend wire W around mandrel 67 as indicated at 134 in said figure, thus forming the inner loop 117 of the clip (Fig. 21).

Figures 13, 17, 18, 19, 20:
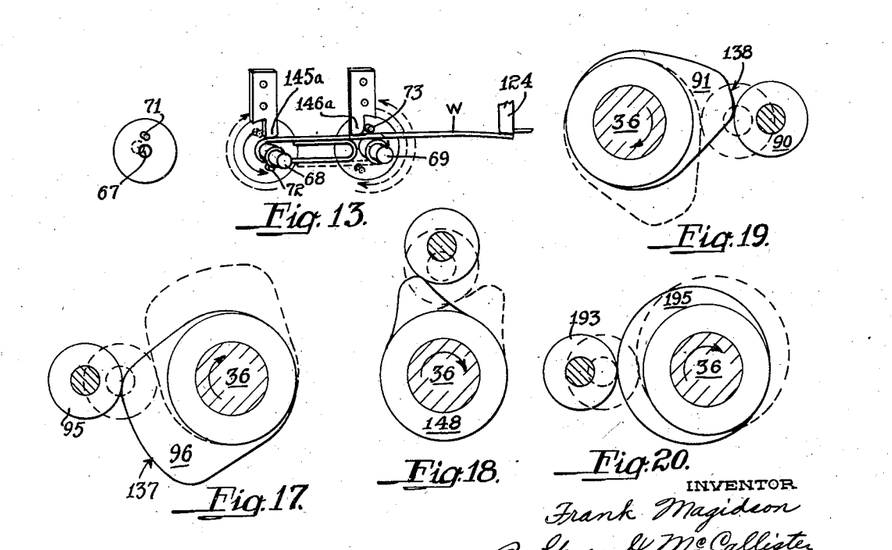
Fig. 13 shows a portion of the mechanism shown in Fig. 12 with the wire completely severed and just before the last loop is formed.
Figure 22:
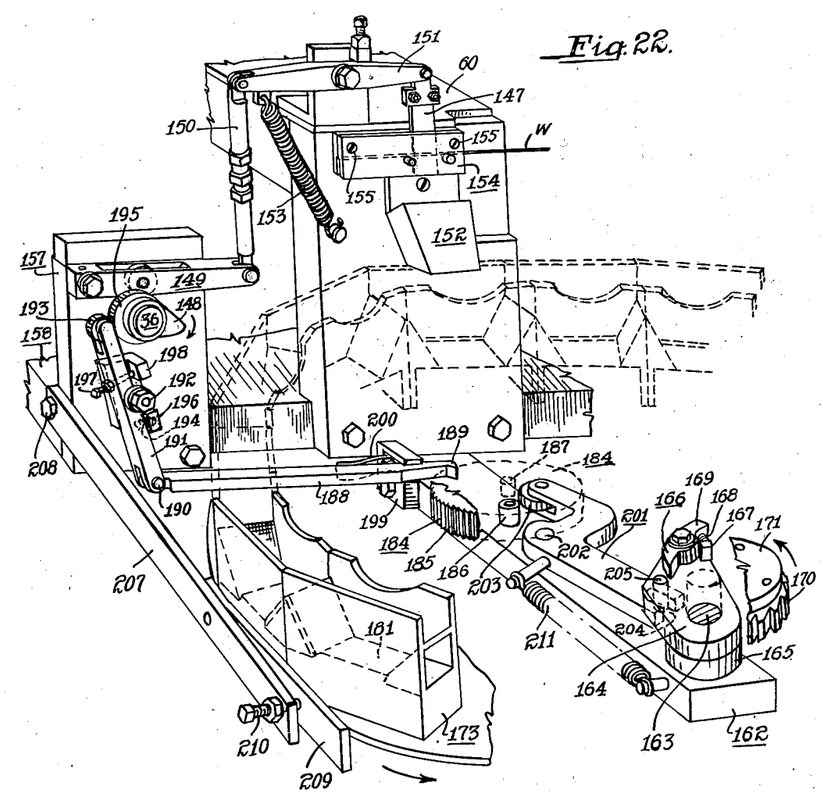
Fig. 22 is a perspective view of the clip knockout mechanism, the box carrier, the mechanisms for counting the clips and rotating the box carrier in a step by step manner so that a predetermined number of clips is deposited in each box.

The positions of mandrels 67, 68 and 69, with relation to the forward faces of the spindles, are so adjusted that as soon as this first loop is formed, rise 135 of cam 113 swings lever 106 far enough toward the rear of the machine to move the forward end of mandrel 67 behind the forward face of spindle 61. As soon as this occurs, spindle 62, by means of rack bar 79, is rotated counterclockwise carrying its bender pin 72 to the position shown in Fig. 6, whereby wire W is bent around part 118 of mandrel 68 to form end loop 119 of the clip. As soon as this loop is formed, rise 136 of cam 131 causes the cutter bar to complete its cut and free the wire. As soon as this occurs, spindle 63, by means of cam 91 and rack bar 78 is caused to rotate in a clockwise direction, causing its bender pin 73 to bend the wire around part 120 of mandrel 69 to form the other end loop 121 of the clip. Concentric faces 137 and 138 of cams 96 and 91 respectively (Figs. 17 and 19) to remain in the position shown in Fig. 6 until end loops 119 and 121 are stretched by tapered expanding parts 122 and 123 of mandrels 68 and 69, respectively. This movement of the mandrels is caused by rise 139 of cam 113 (Fig. 15).

By referring to Figs. 6, 10 and 12, it will be seen that the forward ends of spindles 61, 62 and 63 are located within circular openings in a plate-like block 143, which, by means of suitable screws, is secured against the forward face of housing part 66 (see Fig. 1). A portion 143a of the forward face of block 143 is flush with the ends of the spindles, while part 143b of said block extends forwardly of face 143a, and its lower face 143c, in co-operation with pins 71, 72 and 73 and mandrels 67, 68 and 69 forms the means for guiding the wire into position within the loop bending or forming mechanism of the machine.

Secured in spaced relation within a groove 144 in part 143b of block 143, are hardened members 145 and 146 which form side guides for a reciprocating clip knockout blade 147 (Fig. 6). The lower end 145a of hardened member 145 projects downwardly immediately in front of the forward end face of spindle 62 while the lower end 146a of hardened member 146 projects downwardly immediately in front of the forward end face of spindle 63.

By referring to Fig. 6, it will be seen that when the tapered loop expanding portions 122 and 123 of mandrels 68 and 69 are being moved inwardly of spindles 62 and 63, the substantially straight side members 140, 141 and 142 of the clip immediately adjacent end loops 119 and 120 are prevented from moving laterally outward by pins 72 and 73 in co-operation with said ends 145a and 146a. Thus, as these tapered expanding portions of the mandrels are withdrawn into their spindles, and through end loops 119 and 121 of the clip, these loops are expanded and the various parts of the clip are given a permanent set. This operation causes the adjacent substantially straight side members of the clip to lie permanently in contact one with the other.

As soon as this expanding operation is performed, rise 148 of cam 43 causes mandrels 68 and 69 to be fully retracted or moved into their spindles, thus freeing the clip.

As soon as the clip is freed, a knockout blade 147, through the agency of a cam 148, a follower 149, an adjustable link 150 and a pivoted lever 151 causes the knockout blade to force the finished clip down into the chute 152. A spring 153 holds the roller of follower arm 149 in contact with cam 148. A plate 154 (Fig. 10) by means of screws 155 is secured against the forward face of part 143b of block 143, and, having openings through which the mandrels extend, forms a cover for the wire bending mechanism. In addition to this, it holds the knockout blade in place within its groove 144.

Main shaft 36 of the machine, to which all of the cams are secured, is journaled in bearings in posts 156 and 157 which extend upwardly from base 158 of the machine. Frame part 32 as well as housing part 66 are supported by said base which in turn is supported at the desired height by suitable legs, not shown.

Figures 25, 26:
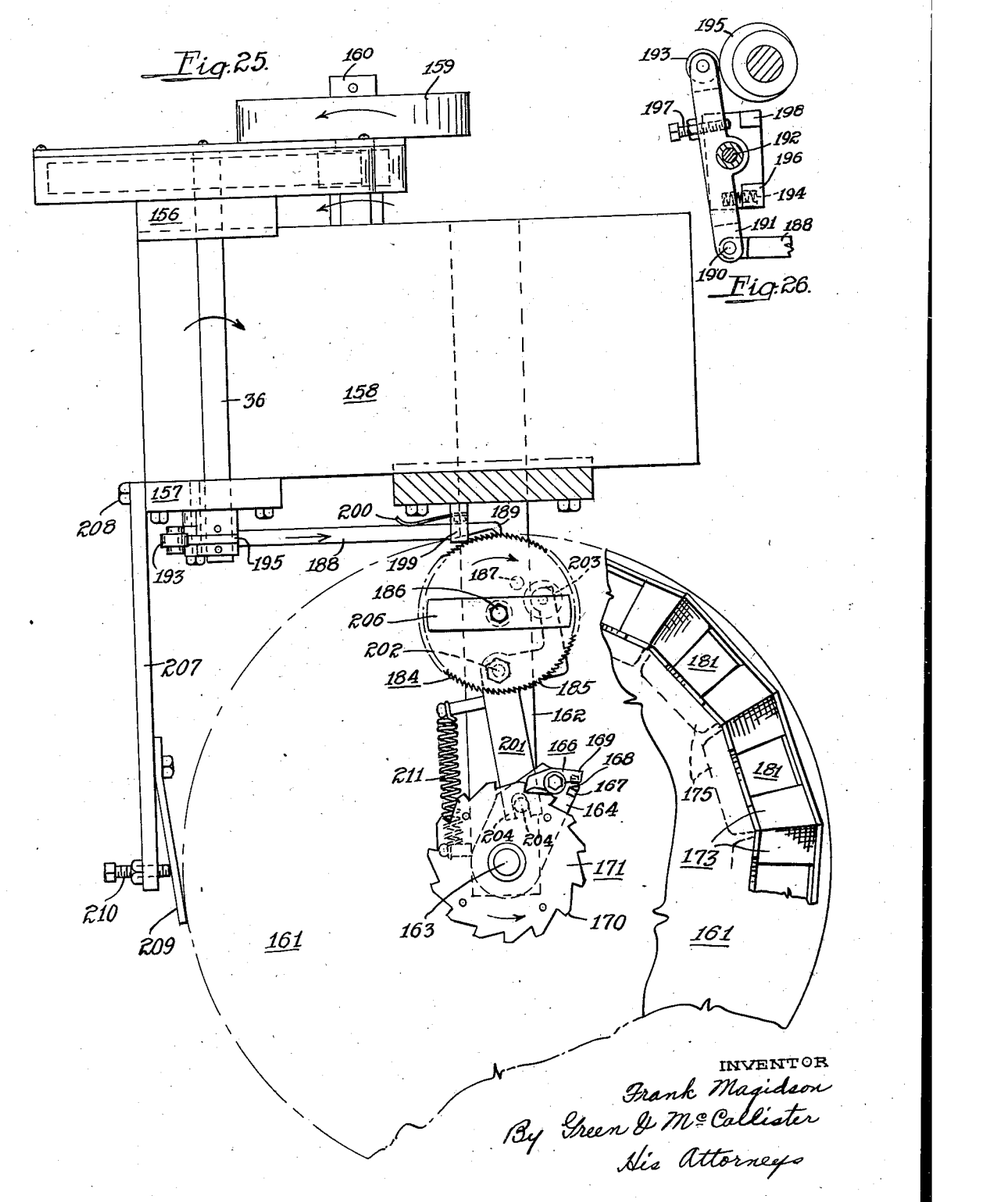
Fig. 25 is a top plan view of the box carrier and its operating mechanism and is taken in a plane just below the floor of the box carrier.
Fig. 26 is a detail view of part of the box carrier operating mechanism.

The machine is adapted to be belt driven by a motor (not shown) and is provided with a belt wheel 159. Reduction gearing, indicated by dotted lines in the left-hand upper corner of Fig. 25, is interposed between belt wheel shaft 160 and main shaft 36 of the machine.

Box carrier and clip counting mechanism

The box carrier table which is numbered 161 comprises a circular flat metal plate which is supported for rotation in front of chute 152 by a support bar 162 secured to the underside of base 158 of the machine and which projects forwardly therefrom in line with said chute. Projecting upwardly through said bar near its outer end is a stub shaft 163.

A pawl carrier 164 having a lower annular bearing portion 165 rests on the top surface of bar 162 and loosely surrounds said stub shaft. Pawl carrier 164 near one end carries a pivoted pawl 166 and an abutment 167. A spring 168 positioned between an arm 169 of said pawl and said abutment 167 yieldingly forces said pawl into engagement with the teeth 170 of ratchet wheel 171.

Ratchet wheel 171 loosely surrounds stub shaft 163 and bears on the upper surface of pawl carrier 164. Box carrier 161 is supported by ratchet wheel 170 and is secured thereto by bolt and slot connections such as 172, thus permitting angular adjustment between the ratchet wheel and the box carrier.

Figures 23, 24:
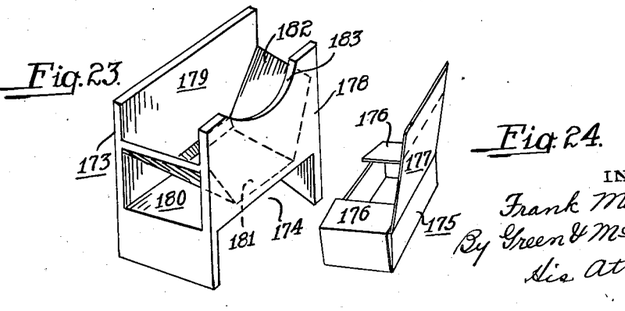
Fig. 23 is a perspective view of one of the box holders of the box carrier.
Fig. 24 is a perspective view of one of the boxes.

A series of box holding units 173 (such as disclosed in detail in Fig. 23) is supported by and secured to box carrier table 161 adjacent its outer edge. Each of these units comprises a stall or compartment 174 for receiving a cardboard or heavy paper box 175 such as shown in Fig. 24, with the end portions 176 of its top folded down into closed position, as shown in said figure, and with the remaining portion 177 of its top projecting vertically and lying in front of upstanding wall 178 of its box holding unit.

Rear wall 179 of each unit is adapted to lie in line with or slightly behind the rear wall of chute 152 as the units move in succession beneath the chute.

Roof 180 of each stall 174 is provided with a rectangular opening 181 which is of slightly less size than the opening in the top of a box as the box is inserted within its stall.

The end walls 182 of each unit 173 are inclined inwardly from the side edges of the unit to opening 181, and these inclined walls, together with the front and rear walls 178 and 179 form a hopper for receiving and guiding the clips into the boxes as they are discharged through chute 152.

Each front wall 178 is provided with a cut-away portion, as shown at 183, to facilitate removal of the boxes from their stalls by the operator of the machine.

In the machine chosen for illustrating this invention, there are fifteen box holding units on table 161 and there are therefore fifteen teeth in ratchet wheel 170.

A ratchet wheel 184, having one hundred teeth 185, (since 100 clips are deposited in each box 175) is mounted for rotation about a stub shaft 186 carried by support arm 162, and has its under face spaced a distance above said support arm. A pin 187 projects downwardly from the lower face of ratchet wheel 184.

A pawl bar 188 carrying a pawl 189 at its free end, for engagement with teeth 185 of ratchet wheel 184, at its opposite end is pivotally connected, as at 190, to the lower end of a follower lever 191. This follower lever is pivotally mounted on a stub shaft 192, and, at its upper end carries a cam contact roller 193 which is yieldingly forced by a spring 194, toward a cam 195 on main shaft 36.

One end of spring 194 is located in a pocket formed for its reception in follower lever 191, while its opposite end is located in a pocket formed in a fixed abutment 196.

The follower lever, above its pivot point, is drilled and tapped to receive an adjustment screw 197, which screw extends through the follower lever in line with a fixed abutment 198. By means of adjustment screw 197, the throw of follower lever 191, occasioned by cam 195, may be regulated.

The outer or free end portion of pawl bar 188 is carried within a guide block 199, and its pawl 189, is yieldingly forced into contact with teeth 185 of ratchet wheel 184 by means of a leaf spring 200, which spring is carried by guide block 199.

A lever arm 201 pivoted to support bar 162, by a pivot pin 202, at one end carries a roller 203 positioned in the path of travel of pin 187 which projects downwardly from the lower face of ratchet wheel 184. Lever arm 201, at its opposite end from roller 203, is bifurcated as at 204 and straddles a pin 205 which projects downwardly from pawl arm 164.

A spring bar 206, which is rigidly secured to the top of pin 186, has its opposite ends inclined downwardly so as to make f. ctional contact with the top surface of ratchet wheel 184.

A bar 207 secured to the base of the machine, as at 208, carries a brake shoe 209 which bears against the outer edge of table 161. The friction exerted by said brake shoe on said table edge is made adjustable by an adjustment screw 210 which projects through bar 207 and into contact with the rear face of the brake shoe.

The construction and arrangement of the clip counting mechanism, and the box carrier rotating mechanism, is such that each time a clip is discharged through chute 152 and into the box therebeneath by clip knockout bar 147, pawl 189 advances ratchet wheel 184 in a clockwise direction the distance of one tooth, and, when 100 clips have been deposited in said box, pin 187 depending from the underside of ratchet wheel 184 contacts with roller 203 and swings lever 201 and pawl arm 164 against the stress of spring 211 so that ratchet wheel 171 is advanced one tooth by pawl 166, and table 161 secured thereto is moved a sufficient distance counterclockwise to carry the next box holding unit 173 into clip receiving position below the chute.

*The general operation of the machine as a whole*

The wire from which the clips are formed is preferably what is known in the trade as "tinned paper clip" steel wire and the diameter of the wire depends upon the size of clip being made. The wire comes in coils and a coil is preferably placed over a vertically extending tubular member having the general shape of a truncated cone. The coil lies in a horizontal position, so that as the wire is drawn therefrom into the machine, it spirals around the tubular member in its upward travel; the coil remaining stationary. The coil and its support have not been illustrated, since they form no part of the machine.

The reciprocating wire feeder, on its feeding strokes, draws or pulls a length of wire through the mechanism which first removes the coil set or the strain occasioned in the wire during its previous coiling. The wire then passes through the straightener rolls and is fed past the cutting blade and into the clip forming section of the machine.

During the time the wire is fed into this section, the spindles are stationary, and their forming pins which successively bend the wire around the mandrels, are in position above the mandrels; the wire being fed between the mandrels and said pins.

When the wire reaches position within this section, the cutter blade is moved down to partially sever the length of wire which is to form one clip. The spindle farthest removed from the cutter blade is then rotated counterclockwise whereby its pin bends the wire around its mandrel to form loop 117. The mandrels are then drawn inwardly of the spindles until said end mandrel is wholly retracted within its spindle. The middle spindle is then rotated in a counterclockwise direction, forming the second loop 119, the smaller end loop of the clip. As soon as the second loop is formed, the cutter blade completely severs the wire and the third spindle is then rotated in a clockwise direction to form the third loop, loop 121, the larger end loop of the clip.

The mandrels are then further withdrawn into the spindles. This withdrawing operation causes the frusto-conical portions of the mandrels which form the end loops of the clip to expand said end loops. The mandrels which perform the expanding operation are then further drawn within the spindles thus freeing the clip and allowing it to be forced by the knockout blade downwardly into the chute. This chute conveys the clip into the box therebeneath it on the box carrier.

As soon as one hundred clips have been deposited in this box, the carrier is rotated until the next succeeding box reaches position beneath the chute.

After the wire has been threaded into position in the machine and roll 51 has been moved up to and secured in operating position, all that it is necessary for the operator to do is to place empty boxes in the stalls of the box holding units and remove the boxes as they are filled with clips.

It will be apparent that a number of machines can be tended by one operator, and it will also be apparent that the machine is entirely automatic in its operation.

The method of making "Gem" paper clips disclosed but not claimed herein constitutes the subject-matter of a copending divisional application for patent filed by me on May 18, 1942, and serially numbered 443,430.

Having thus described my invention, what I claim as new and desire to secure by Letters Patent is:

1. In a machine for making "Gem" paper clips from wire, spindles mounted for partial rotation, mandrels extending through said spindles, means for feeding wire past said spindles, means for rotating said spindles, means carried by said spindles for bending said wire around said mandrels to form the loops of the clip, means for reciprocating said mandrels in a step by step manner, and means forming part of the mandrels about which the end loops of the clip are formed for expanding such loops while the clip is held by the wire bending means.

2. In a machine for making "Gem" clips from wire, spindles mounted for partial rotation, mandrels extending through said spindles and mounted for reciprocation therein, means for feeding wire into position with relation to said mandrels, means associated with each spindle for bending the wire around its mandrel, means for reciprocating said mandrels simultaneously and in a step by step manner, and means forming part of the mandrels about which the end loops of the clip are formed for expanding said end loops while the clip is supported by the mandrels.

3. In a machine for making "Gem" clips from wire, three spindles, means for successively oscillating said spindles, mandrels mounted for lengthwise movement within said spindles, means for reciprocating said mandrels, means associated with said spindles for bending the wire about said mandrels to form the loops of the clip, and means carried by the mandrels about which the wire is bent to form the end loops of the clip for expanding said end loops.

4. In a machine for making "Gem" paper clips from a length of wire, three spindles, means for successively oscillating said spindles, mandrels mounted for lengthwise reciprocation within said spindles, means for reciprocating said mandrels in a step by step manner, means carried by said spindles for bending said wire about said mandrels to form the loops of the clip, and means forming part of the mandrels about which the end loops of the clip are formed for expanding said end loops.

5. In a machine for making "Gem" clips from a length of wire, three spindles, means for successively oscillating said spindles, mandrels mounted for lengthwise reciprocation within said spindles, means for reciprocating said mandrels toward and from operative position, means carried by said spindles for bending said wire about said mandrels to form the loops of the clip, and means on the mandrel about which an end loop of the clip is formed for expanding such loop.

6. In a machine for making "Gem" paper clips, wire cutting means, means for feeding a length of wire through said cutting means, means for operating said cutting means to partially cut through the wire to hold the same, means for forming two of the clip loops while the wire is held by said cutting means, means for causing the cutting means to complete the wire cut, and means for forming the third loop of the clip after the cut is completed.

7. In a machine for making "Gem" paper clips, wire cutting means, means for feeding a length of wire through said cutting means, means for operating said cutting means to partially cut through the wire to hold the same, means for forming two of the clip loops while the wire is held by said cutting means, means for causing the cutting means to complete the wire cut, means for forming the third loop of the clip after the cut is completed, and means for expanding at least one of the end loops of the clip.

8. In a machine for making "Gem" clips from wire, wire looping mechanism, means for feeding the wire into position within the wire looping mechanism, a movably mounted cutter block having an opening therethrough through which the wire passes, a cutter blade mounted for movement across the path of said wire at the exit end of the cutter block, a spring for yieldingly holding said cutter block in contact with said cutter blade, and means for causing said cutter blade during its cutting movements to first partially cut the wire to hold the same against movement during operation of part of the wire looping mechanism and then to completely sever the wire preparatory to operation of the remainder of the wire looping mechanism.

9. In a machine for making "Gem" paper clips, wire cutting means, means for feeding a length of wire through said cutting means, means for operating said cutting means to partially cut through the wire to hold the same, means for forming two of the clip loops while the wire is held by said cutting means, means for causing the cutting means to complete the wire cut, means for forming the third loop of the clip after the cut is completed, and means for expanding both end loops of the clip.

10. In a machine for making "Gem" paper clips, wire cutting means, means for feeding a length of wire through said cutting means, means for operating said cutting means to partially cut through the wire to hold the same, means for forming the center and one end loop of the clip while the wire is held by said cutting means, means for causing the cutting means to complete the wire cut, means for forming the other end loop of the clip after the cut is completed, and means co-operating with the means forming the end loops of the clip for expanding said end loops.

11. In a machine for making "Gem" paper clips from wire having coil set, means for continuously looping a length of wire under tension and in a single plane, means for straightening said wire after looping, wire cutting means, means for operating said wire cutting means to partially cut through the wire to hold the same, means for forming two of the clip loops while the wire is held by the cutting means, means for causing the cutting means to complete the wire cut, and means for forming the third loop of the clip.

12. In a machine for making "Gem" clips, wire cutting means, means for feeding a length of wire through said cutting means, means for causing said cutting means to partially cut through the wire to hold the same against movement, means for forming the inner loop of the clip, means for forming the small end loop of the clip, and moving the inner loop to position, means for causing the cutting means to sever the wire, means for forming the large end loop of the clip, and means for expanding the end loops of the clip while the outer side members of the clip are held against outward movement laterally of the clip.

13. In a machine for forming articles from wire having coil set, a wire straightener comprising idler rollers having parallel axes, means for pulling the wire through said straightener, and means comprising idler rollers having axes which parallel the axes of the straightener rollers, which operate on said wire before it enters the wire straightener and which are so constructed and arranged as to so loop the wire upon itself in a single plane that any tendency in the wire to bend out of said plane, due to coil set is overcome.

14. In a machine for making "Gem" paper clips, wire cutting means, three loop forming devices, means for feeding wire past said cutting means and into position in said loop forming devices, means for operating said wire cutting means to partially cut through said wire to hold the same against movement while two of said loop forming devices are operated, means for causing said cutting means to completely sever the wire after two of the clip loops are formed, means for operating the third loop forming means after the wire is completely severed and means for expanding both end loops of the clip.

15. In a machine for making "Gem" paper clips, a wire cutter, three spindles mounted for partial rotation, mandrels extending lengthwise through said spindles, means for feeding wire past said wire cutter and into position with relation to said spindles, means for operating said wire cutter to partially cut through said wire to hold the same against movement, means for rotating said spindles, means carried by said spindles for bending said wire around said mandrels to form the loops of the clip, means for reciprocating said mandrels, and means carried by at least one of said mandrels for expanding the loop formed by bending the wire around said mandrel.

16. In a machine for making "Gem" paper clips, wire cutting means, three loop forming devices, means for feeding wire past said cutting means and into position in said loop forming devices, means for operating said wire cutting devices, means to partially cut through said wire to hold the same against movement while two of said loop forming devices are operated, means for causing said cutting means to completely sever the wire after two of the clip loops are formed, means for operating the third loop forming means after the wire is completely severed and means after the wire is completely severed and means after the wire is completely severed and tapered means movable through at least one of the end loops of the clip for expanding the same.

17. In a machine for making "Gem" clips from wire, bending means for forming the loops of the clip, a clip chute, means for discharging finished clips into said chute, a box carrier, means for moving said box carrier in a step by step manner past said chute, and clip counting means associated with the means for moving said box carrier, and by which movement of said carrier is initiated after a predetermined number of clips have been discharged through said chute.

18. In a machine for making "Gem" clips from wire, means for forming the loops of the clip, means for discharging finished clips, guiding means for the discharged clips, a carrier mounted means for rotation and which supports an annular series of box holders, means for rotating said carrier past and below said guiding means comprising a ratchet wheel below and secured to said carrier and having ratchet teeth which in number correspond to the number of box holders on the carrier, a second ratchet wheel spaced from said first ratchet wheel and having teeth which in number correspond to the number of clips to be deposited in each holder, pawl means operating in synchronism with the clip discharging means for advancing said second ratchet wheel one tooth as each clip is discharged, and means between said ratchet wheels for advancing the first ratchet wheel one tooth for each complete rotation of the second ratchet wheel; the construction and arrangement being such that each time the second ratchet wheel makes one complete rotation a box holder is moved into position to receive clips from said guiding means.

FRANK MAGIDSON.